United States Patent [19]

Foster

[11] 4,163,933
[45] Aug. 7, 1979

[54] AUTOMATIC ELECTRIC BATTERY CHARGING APPARATUS

[75] Inventor: George W. Foster, Bolton, England

[73] Assignee: Chloride Group Limited, London, England

[21] Appl. No.: 853,425

[22] Filed: Nov. 21, 1977

[30] Foreign Application Priority Data

Nov. 24, 1976 [GB] United Kingdom ............... 49001/76

[51] Int. Cl.² .............................................. H02J 7/04
[52] U.S. Cl. ............................................. 320/20; 320/39
[58] Field of Search ....................... 320/20, 21, 22, 39, 320/40, 37, 38

[56] References Cited

U.S. PATENT DOCUMENTS

| | | | |
|---|---|---|---|
| 3,761,795 | 9/1973 | Clayton et al. | 320/20 |
| 3,794,905 | 2/1974 | Long | 320/39 X |
| 3,895,282 | 7/1975 | Foster et al. | 320/20 |
| 3,912,108 | 10/1975 | Clayton et al. | 320/39 |
| 3,979,658 | 9/1976 | Foster | 320/39 X |
| 3,992,658 | 11/1976 | Bechtold et al. | 320/20 |

*Primary Examiner*—Robert J. Hickey
*Attorney, Agent, or Firm*—Watson, Cole, Grindle & Watson

[57] ABSTRACT

The automatic electric battery charging apparatus includes at least one timer, a voltage comparator arranged to compare a reference voltage, referred to herein as a staircase voltage, with a control signal varying with battery voltage, jacking means rendered operative by the timer when a first predetermined time interval has elapsed and serving to repeatedly increase the staircase voltage step-by-step relatively to the control signal, by equal steps, so long as the control signal exceeds the reference voltage, and terminating means for initiating the termination if the staircase voltage exceeds the control signal before the jacking means have exceeded a predetermined number of steps from the start of their operation.

12 Claims, 3 Drawing Figures

AUTOMATIC ELECTRIC BATTERY CHARGING APPARATUS

This invention relates to automatic battery charging apparatus, including termination means for initiating the termination of a phase of the charge.

Many proposals have in the past been put forward for automatically terminating the charge of a battery when the battery is fully charged.

In particular the present applicants' British patent specification No. 10977451 describes a charger in which the initiation of termination of the charge is dependent upon the rate of rise of battery voltage, and in particular occurs when the rate of rise falls off as the battery approaches the fully charged condition. This known arrangement depends on monitoring the rise of voltage that occurs in a given time. Applicants U.S. Pat. No. 3,979,658 describes an arrangement including a voltage comparator arranged to compare the reference voltage with a control signal varying with battery voltage, means for repeatedly increasing the reference voltage by a step relatively to the control signal whenever the control signal exceeds the reference voltage, and means for initiating the termination when the time interval between steps exceeds a predetermined value.

According to the present invention automatic electric battery charging apparatus includes at least one timer, a voltage comparator arranged to compare a reference voltage, referred to herein as a staircase voltage, with a control signal varying with battery voltage, jacking means rendered operative by the timer when a first predetermined time interval has elapsed and serving to repeatedly increase the staircase voltage step-by-step relatively to the control signal, by equal steps, so long as the control signal exceeds the staircase voltage, and termination means for initiating the termination if the staircase voltage exceeds the control signal before the jacking means have executed a predetermined number of steps from the start of their operation.

The control signal may depend solely on battery voltage but preferably, as claimed in the latter of the specifications referred to above, the control signal comprises the difference between a signal depending on battery voltage and a signal depending on A.C. supply voltage.

Each step of the staircase voltage may represent no more than a few millivolts per cell of the battery. The duration of the first predetermined time interval may be many times the duration of the predetermined number of steps; for example the first time interval may be about half an hour while the duration of the predetermined number of steps is not more than a few seconds.

In a preferred form of the invention the staircase voltage steps occur at uniform frequency during operation of the jacking means. In this case the predetermined nymber of steps may be determined by the ratio between the said uniform frequency and a second predetermined time interval set by a timer. Preferably the first and second time intervals are measured by separate timers.

In a preferred alternative arrangement the said predetermined number of steps is detected by counting the number of steps taken by the jacking means. Thus the jacking means may comprise a binary counter fed by a clock while the terminating means include a further binary counter fed by the same clock. If the clock runs at uniform frequency, as in the previously mentioned arrangement, the further binary counter can, in effect, be regarded as a timer which times the second time interval. In this case conveniently the counter of the terminating means is provided with a gate serving to block the clock pulses to it when a 1 is emitted by the digital output of a predetermined count, and an OR gate having inputs connected to a number of, or preferably all, lower digital outputs so as to be disabled once the predetermined count is reached but to be enabled at some or preferably all, lower counts.

The invention has the advantage that the apparatus is insensitive to variations of battery voltage (for example due to variations of supply voltage or battery conditions such as temperature), during the major part of the charge. The patent last referred to above, namely No. 3,979,658, describes the employment of a control signal comprising the difference between a signal depending on battery voltage and a signal depending on A.C. supply voltage. By this means the control signal can be rendered very largely independent of variations of supply voltage since their effect on the battery voltage can be largely cancelled out. Complete compensation is however almost impossible and the present invention, if employed in conjunction with a compensation control signal, provides a further safeguard against incorrect operation.

Further features and details of the invention will be apparent from the following description of one specific embodiment, which will be given by way of example with reference to the accompanying drawings in which.

Figure 1:
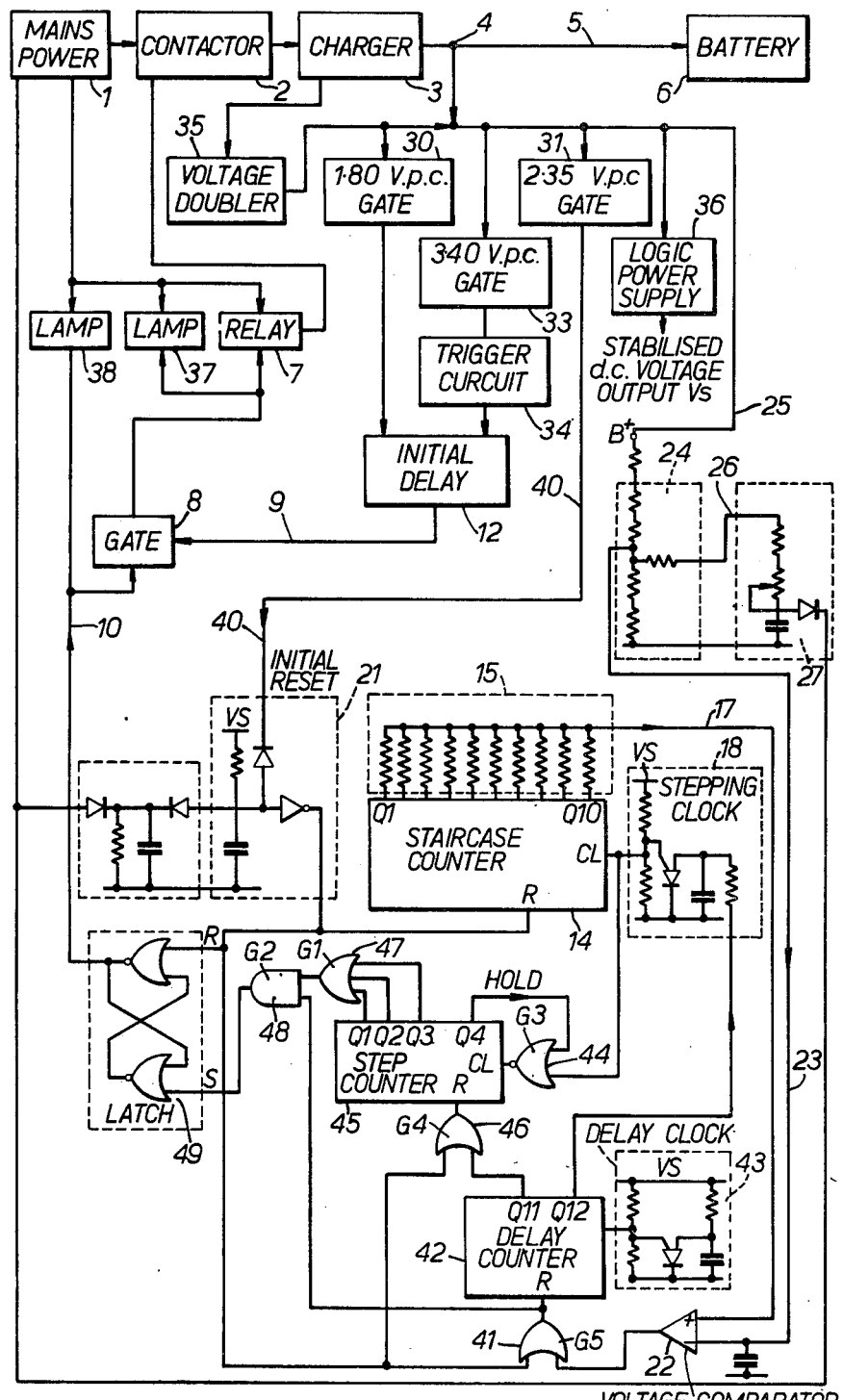
FIG. 1 is a circuit diagram of the embodiment partly in block form (of which the upper part corresponds to FIG. 2 of the latter of the prior specifications referred to above)

The charging circuit comprises A.C. mains supply terminals 1 supplying A.C. power through a contactor 2, to a transformer, choke and rectifier 3, delivering direct current with a taper charge characteristic, to charge terminals 4, and thence through the charger connecting cable 5, to a lead-acid battery 6. The control circuits receive power and voltage signals from the battery 6 via the charger terminals 4. Power is also obtained from the mains for providing a mains voltage compensating unit 27 and for energising two indicating lamps 37, 38 and a relay 7. The latter provides a pair of isolated contacts for switching A.C. power to the coil of the contactor 2. A further input signal is obtained from the secondary winding of the charge transformer and is fed to a voltage doubler 35 to provide an increased D.C. voltage at the charger terminals 4 to switch off the charger when the battery 6 is disconnected.

When a battery is connected to the charger terminals the controller logic circuits receive power from it at substantially constant voltage Vs via a stabilising unit 36, and begin to perform their respective functions. A gate 30 determines whether or not the battery voltage is above the equivalent of 1.80 volts per cell for the number of cells for which the charger is designed. If it is below 1.80 volts per cell the charger does not switch on. If it is above 1.80 volts per cell an initial delay 12 is allowed to expire and the charger switches on at the end of this delay. The switch-on occurs when the initial delay signal 9 disappears from the input of a gate 8 whose output then rises to switch on the relay 7 and the lamp 37. The other input 10 to the gate 8 from the conrol circuit to be described below serves to terminate the charge.

During the course of the charge a mains compensating signal 26 from the unit 27 is subtracted from a battery voltage signal 25 in a summing network 24 to provide a control signal 23. This is compared by a voltage comparator 22 with a staircase signal 17 of a Digital to Analogue (D-A) staircase converter 15 fed with digital signals from a first binary counter 14 (which may be termed a staircase counter) receiving clock signals from a stepping clock 18.

The output of the voltage comparator 22 forms one input to an OR gate 41 whereof the output is applied to the reset terminal of a delay counter 42 which receives clock pulses from a delay clock 43 at a frequency of about 1 Hertz, so that its Q12 output will change state once in about 30 minutes. This signal is delivered to the stepping clock 18 causing it to supply pulses at a frequency of about 20 Hertz to the staircase counter 14.

These clock signals from the clock 18 are also applied to one input of a NOR gate 44 whose other input is obtained from the Q4 output of a step counter 45. The output of the NOR gate 44 is supplied to the clock input of the step counter 45 which has a reset terminal supplied from an OR gate 46, one input of which is drawn from the Q11 output of the delay counter 42. The Q1, Q2 and Q3 outputs of the step counter 45 are supplied to the three inputs of an OR gate 47 the output of which forms one input to an AND gate 48 to which the other input is from the output of the OR gate 41. The output of the AND gate 48 forms the setting input to a latch network 49 of which the output provides the signal 10 for terminating the charge.

An initial reset unit 21, controlled by a mains voltage detector 53 and a 2.35 volt gate 31, applies a reset signal to the staircase counter 14, the latch 49, the OR GATE 46, and the OR gate 41, so long as there is no mains supply or the battery voltage is less than 2.35 volts per cell.

Thus it will be appreciated that the latch 49 can only be set to terminate the charge when the outputs Q1, Q2 and Q3 of the step counter 45 are not all zero, and, in addition, the staircase voltage exceeds the control voltage so that the voltage comparator delivers a 1 signal.

Accordingly the operation is as follows:

So long as the battery voltage is below 2.35 volts per cell the signal 40 causes the initial reset to be applied to all the counters. When the battery voltage reaches 2.35 volts per cell the initial reset is removed and the delay counter 42 begins to count at a frequency a little over 1 Hertz so that the Q12 output delivers a 1 signal after about 30 minutes to start the stepping clock 18.

The stepping clock 18 feeds clock pulses at about 20 Hertz to the staircase counter 14. These clock pulses jack up the staircase signal from the D/A converter 15 in steps of 1 millivolt per cell per step. The clock signals from the stepping clock 18 are also fed through the NOR gate 44 to the step counter 45.

During the part of the charge when gassing occurs the number of steps needed to bring up the staircase voltage to the control voltage after a delay of about half an hour will be substantial e.g. up to 100 or more steps of 1 mv per cell. After 8 steps the Q4 output of the step counter 45 applies a 1 signal to the NOR gate 44 which blocks any further clock signals being applied to the step counter. In this state the outputs Q1, Q2 and Q3 will all be zeros, so that there is no output from the OR gate to the second input of the AND gate 48 and the latch is prevented from being set to terminate the charge.

The stepping clock 18 continues to feed pulses to the staircase counter 14 to go on jacking up the staircase voltage until it exceeds the control voltage, and the voltage comparator 22 gives a 1 output which resets the delay counter as well as supplying a 1 to the second input of the AND gate 48.

Figure 2:
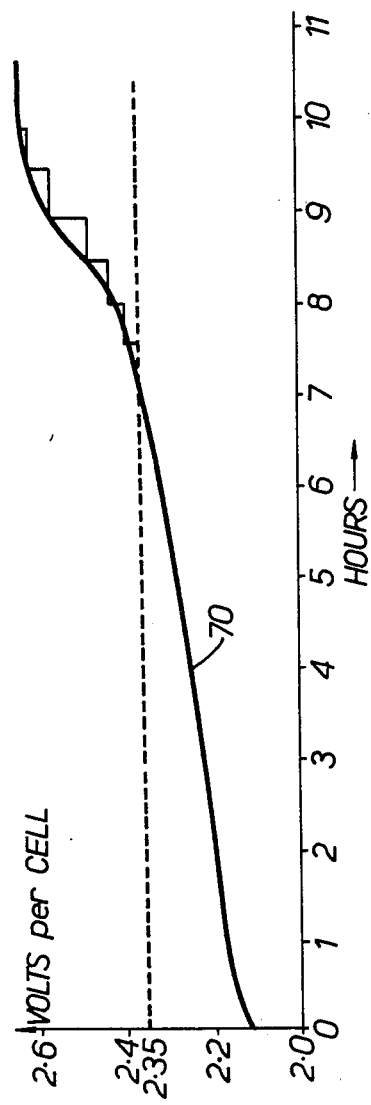
FIG. 2 is a graph (not to scale) of a typical variation of control voltage with time.

Thus as indicated in FIG. 2 the staircase voltage is increased by a series of steps at uniform time intervals of about 30 minutes, the rise being sufficient in each case to cause the staircase voltage to overtake the control voltage.

Figure 3:
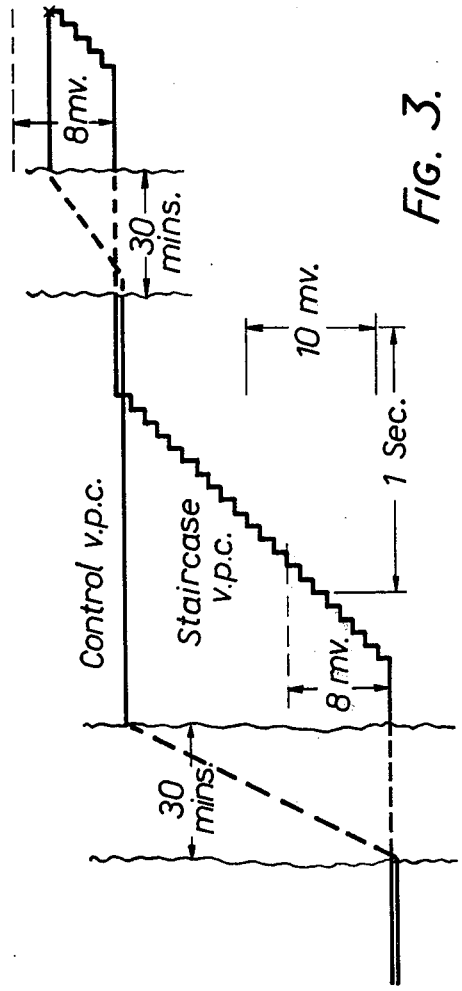
FIG. 3 is an enlarged detail, again not to scale, showing two of the steps which would appear as vertical lines of FIG. 2.

The rise actually occurs in steps of 1 millivolt at a frequency of 20 Hertz, as indicated in FIG. 3, but since it occupies at most a few seconds it appears as a vertical straight line in FIG. 2.

The staircase voltage has been jacked up to at most 1 millivolt per cell above the control voltage, so that quite a short period suffices for the control voltage to overtake the staircase voltage.

Hence after at most a few minutes the voltage comparator output becomes zero and blocks the AND gate 48 and removes the reset of the delay counter 42 which again starts to count up for the next period of about 30 minutes. After about 15 minutes its Q11 output resets the step counter 45 through the gate 46, but there are no steps to count until the delay counter reaches the Q12 count and starts the stepping clock 18 as described above.

When, however, the battery is substantially fully charged a point is reached at which, after half an hour, as indicated at the right of FIG. 3, less than 8 millivolts per cell increase of the staircase voltage is required to raise it above the control voltage. In these circumstances the voltage comparator will give a 1 output to the OR gate 41 to reset the delay counter 42 and provide an input to enable the AND gate 48 while one or more of the outputs Q1, Q2 and Q3 of the step counter is a 1 and enables the OR gate 47. In these circumstances both inputs to the gate 48 will be 1 and its output will set the latch 49 to terminate the charge.

Further details of the apparatus may be as described in the prior U.S. Pat. No. 3,979,658 referred to above. For such details the reader is referred to that specification, and it is thought unnecessary to describe them herein.

What we claim is:

1. Automatic electric battery charging apparatus comprising at least one timer, a voltage comparator arranged to compare a reference voltage, referred to herein as a staircase voltage, with a control signal varying with battery voltage, jacking means rendered operative by the timer when a first predetermined time interval has elapsed and serving to repeatedly increase the staircase voltage step-by-step relatively to the control signal, by equal steps, so long as the control signal exceeds the reference voltage, and terminating means for initiating the termination if the staircase voltage exceeds the control signal before the jacking means have exceeded a predetermined number of steps from the start of their operation.

2. Apparatus as claimed in claim 1 in which the control signal comprises the difference between a signal depending on battery voltage and a signal depending on A.C. supply voltage.

3. Apparatus as claimed in claim 1 in which each step of the staircase voltage represents no more than a few millivolts per cell of the battery.

4. Apparatus as claimed in claim 1 in which the duration of the first predetermined time interval is many times the duration of the predetermined number of steps.

5. Apparatus as claimed in claim 4 in which the first time interval is about half an hour and the duration of the predetermined number of steps is not more than a few seconds.

6. Apparatus as claimed in claim 1 in which the staircase voltage steps occur at uniform frequency during operation of the jacking means.

7. Apparatus as claimed in claim 6 in which the predetermined number of steps is determined by the ratio between the said uniform frequency and a second predetermined time interval set by a timer.

8. Apparatus as claimed in claim 7 in which the first and second time intervals are measured by separate timers.

9. Apparatus as claimed in claim 1 in which the said predetermined number of steps is detected by counting.

10. Apparatus as claimed in claim 9 in which the jacking means comprise a binary counter fed by a clock and the terminating means include a further binary counter fed by the same clock.

11. Apparatus as claimed in claim 10 in which the counter of the terminating means is provided with a gate serving to block the clock pulses to it when a 1 is emitted by the digital output of a predetermined count, and an OR gate having inputs connected to all, or a number of, lower digital outputs so as to be disabled once the predetermined count is reached but to be enabled at all or some lower counts.

12. Apparatus as claimed in claim 11 including an AND gate permitting operation of the terminating means when the counter is at one of the said lower counts, and the comparator indicates that the control voltage exceeds the staircase voltage.

* * * * *